US006708028B1

(12) United States Patent
Byrne

(10) Patent No.: US 6,708,028 B1
(45) Date of Patent: Mar. 16, 2004

(54) MULTI-MODE RADIO TELEPHONE

(75) Inventor: John Daniel Byrne, Shepperton (GB)

(73) Assignee: Nokia Mobile Phones, Ltd., Salo (FI)

( * ) Notice: Subject to any disclaimer, the term of this patent is extended or adjusted under 35 U.S.C. 154(b) by 1528 days.

(21) Appl. No.: 08/746,746

(22) Filed: Nov. 15, 1996

Related U.S. Application Data

(63) Continuation of application No. 08/359,910, filed on Dec. 20, 1994, now abandoned.

(30) Foreign Application Priority Data

Dec. 22, 1993 (GB) .............................................. 9326189

(51) Int. Cl.⁷ ................................................. H04Q 7/20
(52) U.S. Cl. ................. 455/426.1; 455/439; 455/552.1; 455/432.2
(58) Field of Search ................................ 455/426, 432, 455/436, 439, 440, 441, 444, 450, 552, 553, 426.1, 426.2, 432.1, 432.3, 553.1, 74.1, 552.1; 370/322, 333, 337, 345, 347

(56) References Cited

U.S. PATENT DOCUMENTS

| 4,989,230 A | * | 1/1991 | Gillig et al. .................... 379/59 |
| 5,127,042 A | * | 6/1992 | Gillig et al. .................... 379/59 |

(List continued on next page.)

FOREIGN PATENT DOCUMENTS

| EP | 0415502 | 3/1991 |
| FR | 2687874 | 8/1993 |
| GB | 2225512 | 5/1990 |
| GB | 2240696 | 8/1991 |
| GB | 2242805 | 10/1991 |

(List continued on next page.)

OTHER PUBLICATIONS

"The Universal Mobile Telecommunication System", by Chia, IEEE Communication Magazine, vol. 30, No. 12, Dec. 1992, pp. 54–62.

"Provision of Mobility for DECT by Interworking with GSM" by Lundstrom, EPOC and N '93, Eleventh Annual Conference, The Hage, pp 97–99, 1993.

Japanese Abstract Dialog Accession No. 04175818 of Japanese Publication No.: JP 5167518 A (Matsushita), Jul. 2, 1993, one page.

*Primary Examiner*—Nay Maung
*Assistant Examiner*—Tanmay Lele
(74) *Attorney, Agent, or Firm*—Perman & Green, LLP

(57) ABSTRACT

A radio telephone capable of being operated in more than one radio telephone system, comprising communication means respectively associated with each of the more than one radio telephone system, monitoring means for monitoring signals of the more than one radio telephone system, and selection means responsive to said monitoring means for automatically selecting and re-selecting respective said communication means in accordance with the signals of one of the more than one radio telephone system fulfilling at least one predetermined criterion. The predetermined criterion can be based on a number of features such as received signal strength, access rights, system requests, least BER or frame error rate and user velocity. The radio telephone can be used in a radio telephone system adapted to co-operate with at least one other radio telephone system, comprising user information exchange means respectively associated with each of the at least one other radio telephone system for exchanging user information signals between the radio telephone system and the at least one other radio telephone system, monitoring means for monitoring user information signals of the radio telephone systems and selection means for automatically assigning and re-assigning a user to one of the radio telephone systems in accordance with the user control signals fulfilling at least one predetermined criterion.

21 Claims, 5 Drawing Sheets

U.S. PATENT DOCUMENTS

| | | | | |
|---|---|---|---|---|
| 5,159,593 A | * 10/1992 | D'Amico et al. | ............ | 370/337 |
| 5,235,632 A | * 8/1993 | Raith | ............................ | 379/59 |
| 5,278,991 A | * 1/1994 | Ramsdale et al. | .......... | 455/33.2 |
| 5,367,558 A | * 11/1994 | Gillig et al. | .................... | 379/59 |
| 5,384,824 A | * 1/1995 | Alvesalo | ........................ | 379/59 |
| 5,442,680 A | * 8/1995 | Schellinger et al. | .......... | 455/426 |
| 5,463,674 A | * 10/1995 | Gillig et al. | .................. | 455/552 |
| 5,533,099 A | * 7/1996 | Byrne | ........................ | 370/347 |
| 5,659,598 A | * 8/1997 | Byrne et al. | .................. | 455/436 |

FOREIGN PATENT DOCUMENTS

| | | | |
|---|---|---|---|
| GB | 2252699 | | 8/1992 |
| GB | 2269723 | | 2/1994 |
| GB | 2282730 | | 4/1995 |
| GB | 2282731 | | 4/1995 |
| GB | 2284725 | | 6/1995 |
| GB | 2285198 | | 6/1995 |
| JP | 6252837 | | 6/1994 |
| WO | WO 92/03006 | | 2/1992 |
| WO | WO 92/12602 | | 7/1992 |
| WO | WO 93/16560 | * | 8/1993 |

* cited by examiner

MULTI-MODE RADIO TELEPHONE

This is a continuation of application Ser. No. 08/359,910 filed on Dec. 20, 1994.

FIELD OF THE INVENTION

The present invention relates to a radio telephone, and in particular to a radio telephone operable for more than one system.

BACKGROUND OF THE INVENTION

Over the last ten years there has been a rapid growth in the use and availability of radio telephone systems. As part of this growth there has been a proliferation of different types of radio telephone system, offering the user a variety of services, geographical coverage and cost. Many of these different radio telephone systems cover the same, or a part of the same, geographical area as each other.

Typically, different radio systems operate on different radio frequencies, utilise different modulation techniques, signalling techniques and intra-system protocols etc. to each other. Thus, a radio telephone designed for one system is generally unable to be used on another system. Thus if a user wishes to have access to more than one system it is necessary to have either more than one radio telephone or a radio telephone capable of operating in more than one system. Having more than one radio telephone is inconvenient for the user. Known radio telephones capable of operating in more than one system typically consist of little more than 2 separate phones combined in a signal housing. The preference for operating in a particular system is user defined as disclosed in U.S. Pat. No. 4,989,230.

A particularly useful and appropriate environment for multi-mode radio telephones is the recently available cellular and cordless telephone systems. In the prior art, cordless telephones are typically used in the home and office to allow the user to place and receive calls at any point throughout the house via an RF link with a home base station located within the house or office. Such cordless telephones are connected via the home base station to the user's telephone landline which in turn is connected to the Public Switched Telephone Network (PSTN). Further, there are known second generation cordless telephone systems such as CT-2 or DECT which are digital systems. Such CT-2 or DECT systems extend beyond conventional domestic operation of cordless telephones by allowing the user to establish an RF link between a CT-2 or DECT radio telephone and a base station in a more publicly accessible location e.g. outside of the user's home, a railway station, shopping mall or airport. Such base stations are known as telepoint base stations and are linked to the PSTN in much the same way as a home base station. Some cordless, and in particular DECT radio telephones, are now able to receive calls via telepoint base stations whereas hitherto they were only able to place them. A description of such a system can be found in PCT international patent application WO 92/03006. Thus, placing and receiving calls whilst geographically roaming is possible in cordless telephone systems.

However, cordless telephone systems are low power systems and each base station provides telecommunications within only approximately a 150 meter radius of the base station, dependent upon the terrain and any man-made objects which could interfere with signalling between a cordless telephone and the base station. Such systems are generally only used in areas of high user density and thus tend to be limited to urban areas. This clearly restricts the geographical mobility of a CT-2, DECT or the like cordless telephone user.

In the prior art there are known so called cellular radio telephone systems having base stations which cover a wide geographical area (cell), eg 35 km diameter. However, in urban areas where the user density is high the cells are much smaller and operate at lower powers to facilitate frequency re-use thereby increasing the communication channel density.

Cellular systems have advantages over cordless systems since they allow a user to place and receive calls over a large area. Additionally they are suitable for use in moving vehicles. This is because cellular telephone systems have sophisticated handover procedures to facilitate switching between cells as a user's vehicle crosses from one cell to another. Furthermore, the cells are larger than in cordless systems and thus handovers occur less often, even if travelling in a vehicle. This ensures continuity of service and is particularly important during a call. However, the cost of a cellular telephone call is significantly greater than the cost of a cordless telephone call, since cordless telephone calls are made by way of the user's land line PSTN link and cost the same as landline calls, whilst cellular telephone calls are made by way of expensive cellular base stations and cellular switching equipment and cost much more than land line telephone calls. In order for a user to be able to utilise both cellular and cordless telephone systems via a single radio telephone handset a so-called cellular cordless telephone (CCT) has been proposed in U.S. Pat. No. 4,989,230. Both the cellular system and the cordless system are monitored by the CCT for incoming calls and the CCT automatically enters a user defined preferred mode for answering an incoming call if the system corresponding to that mode is available. When placing a call the user initiates the call as either cellular or cordless and the CCT connects the call appropriately. In order for the user to be able to make a choice the available systems can be displayed on the CCT. When using the CCT, the user has to make the decision as to which telephone system is used. Furthermore, the prior art CCT disclosed in U.S. Pat. No. 4,989,230 requires the user to select transfer of a cordless call to the cellular system should the cordless signals deteriorate (eg the user moves out of range of a cordless base station or the user's velocity increases). Additionally, optimisation of the available systems is likely not to be achieved if the user is left to decide which system is to be used. One of the disadvantages of the CCT disclosed in U.S. Pat. No. 4,989,230 is that a user might not know if a signal is deteriorating until it is too late and the ongoing call is lost. For example, a visual indication of poor signal shown on the CCT is likely to be missed by a user, since in use the CCT will be placed at the side of the user's head and thus visual indications would not be visible to the user. Other indications such as an audible tone or alarm would interfere with the user's ongoing call, and would be annoying and irritating to the user.

BRIEF SUMMARY OF THE INVENTION

A first aspect of the present invention provides a radio telephone operable in more than one radio telephone system, comprising communication means respectively associated with each of the more than one radio telephone system, monitoring means for monitoring signals of the more than one radio telephone system, and selection means responsive to said monitoring means for automatically selecting and re-selecting respective said communication means in accordance with the signals of one of the more than one radio telephone system fulfilling at least one predetermined criterion, and a second aspect of the invention provides a method for operating a radio telephone in more than one radio telephone system, comprising, monitoring signals of the more than one radio telephone system determining whether the signals of the more than one radio telephone system fulfill at least one predetermined criterion, and automatically selecting and re-selecting for which of the more than one radio telephone system the radio telephone is operable in accordance with the signals fulfilling the at least one predetermined criterion.

These have the advantage that the radio telephone is not only operable for more than one radio telephone system, but that it is able to automatically select and re-select which of the available radio systems to use. The selection can be based on any predetermined criterion or combination of criteria. For example, the radio telephone can be set to operate on the cheapest system available (e.g. cordless system). Such criteria are likely to be factory set, but optionally could be user programmable. A further advantage is that the radio telephone user can know of incoming calls on systems other than the one for which the radio telephone is presently operable, and can manually switch to operate in the appropriate system thereby overriding the automatic selection. Of course, if the radio telephone is already in a call then an indication that there is an incoming call can be made to the user (eg call waiting indication). Such a system would be of particular benefit if incoming calls from systems other than the one in which the radio telephone is currently operable were not forwarded to that system. An additional advantage is that automatic inter system handover would be possible, based on the predetermined criterion. For example, if the user were travelling out of a system service area and the service breaks down, a radio telephone operable in accordance with the present invention may automatically handover to a system having a good service (e.g. cordless to cellular). Similarly, if a user was engaged in a call on a high cost system and a low cost system became available such a radio telephone may automatically handover the call to the low cost system. Examples of inter-system handover are disclosed in co-pending British Patent Applications no. 9320814.8, no. 9320815.8 and no.9326169.1.

In a preferred embodiment of the first and second aspects of the invention there is provided a visual indication of the one of the more than one radio telephone system. This has the advantage that the user is informed of what radio systems are available. Thus, if the only radio systems available are ones which the user does not wish to use, the radio telephone can be turned off. This would avoid the problem of receiving calls on particularly expensive radio systems, if these radio systems were the only ones available.

Preferably, at least one predetermined criterion is a user indicated preference for one of said more than one radio telephone system. This has the advantage that the user can pre-program the radio telephone to select certain types of radio system, eg the cheapest available. Alternatively, the user indicated preference could be a manually indicated preference during operation of the radio telephone. Such a manually indicated preference could override any predetermined criteria and would give the user instantaneous control over which system the radio telephone is operable in at a given moment of time.

Suitably, at least one predetermined criterion can be one or a combination of the following requirements that the selected radio system is one for which:

i) the received signal strength at the radio telephone is greatest;

ii) the radio telephone has access rights;

iii) the selected radio telephone system requests selection;

iv) the bit error rate, frame error rate or the like is the lowest; and v) the user velocity is appropriate.

These have the advantages in that the system for which there is a high probability of successful communication can be selected. Furthermore, the radio telephone can be set to select only those systems for which it has access rights thereby avoiding possible extra high costs for using a service for which no prior access arrangements have been made.

Advantageously, the monitoring means monitors the signals intermittently. Thus, less power is consumed by the radio telephone's monitoring process which results in prolonged battery life. Furthermore, signals required to carry out the monitoring process are used less often which allows more time for the radio telephone to process signals for the currently operating radio system, in particular when a call is in progress. Intermittent monitoring is particularly effective during periods when no calls are in progress.

Typically, the radio system in which the radio telephone is operating will be a TDMA system and it would be advantageous if the monitoring process were carried out during a period of TDMA inactivity (eg unused slots). Thus, there would be none or at least reduced interference with the TDMA system signals. Additionally there is the benefit that the same components may be utilised for more than one terminal mode and so cost/size savings can be made. Both TDMA sharing of receiver functions between the systems and also transmitter functions can be utilised. By sharing transmitter functions, communications with a second system may start before releasing a first system.

In a third aspect of the invention there is provided a radio telephone system adapted to co-operate with at least one other radio telephone system, comprising user information exchange means respectively associated with each of the at least one other radio telephone system for exchanging user information signals between the radio telephone system and the at least one other radio telephone system, monitoring means for monitoring user information signals of the radio telephone systems and selection means for automatically assigning and re-assigning a user to one of the radio telephone systems in accordance with the user control signals fulfilling at least one predetermined criterion, and in a fourth aspect of the invention there is provided a method for operating a radio telephone system adapted to co-operate with at least one other radio telephone system, comprising, exchanging user information respectively associated with each of the at least one other radio telephone system between the radio telephone system and the at least one other radio telephone system, monitoring user information signals exchanged between the radio telephone systems, determining whether the user information signals fulfill at least one predetermined criterion, and automatically assigning and re-assigning a user to one of the radio telephone systems in accordance with the user information signals fulfilling the at least one predetermined criterion.

These have the advantage that users are automatically assigned or re-assigned to radio telephone systems dependent upon certain criteria being fulfilled. These criteria can be set by the radio systems themselves, or can be based on instructions from users. Since the radio telephone system exchanges user information between itself and other radio systems, the assigning and re-assigning of users to particular radio telephone systems can be made easily and quickly.

Additionally, calls from users can be routed through different radio telephone systems based on the predetermined criteria and the user information.

DETAILED DESCRIPTION OF EMBODIMENTS OF THE INVENTION

Specific embodiments of the invention will now be described, by way of example only, and with reference to the above described drawings.

Figure 1:
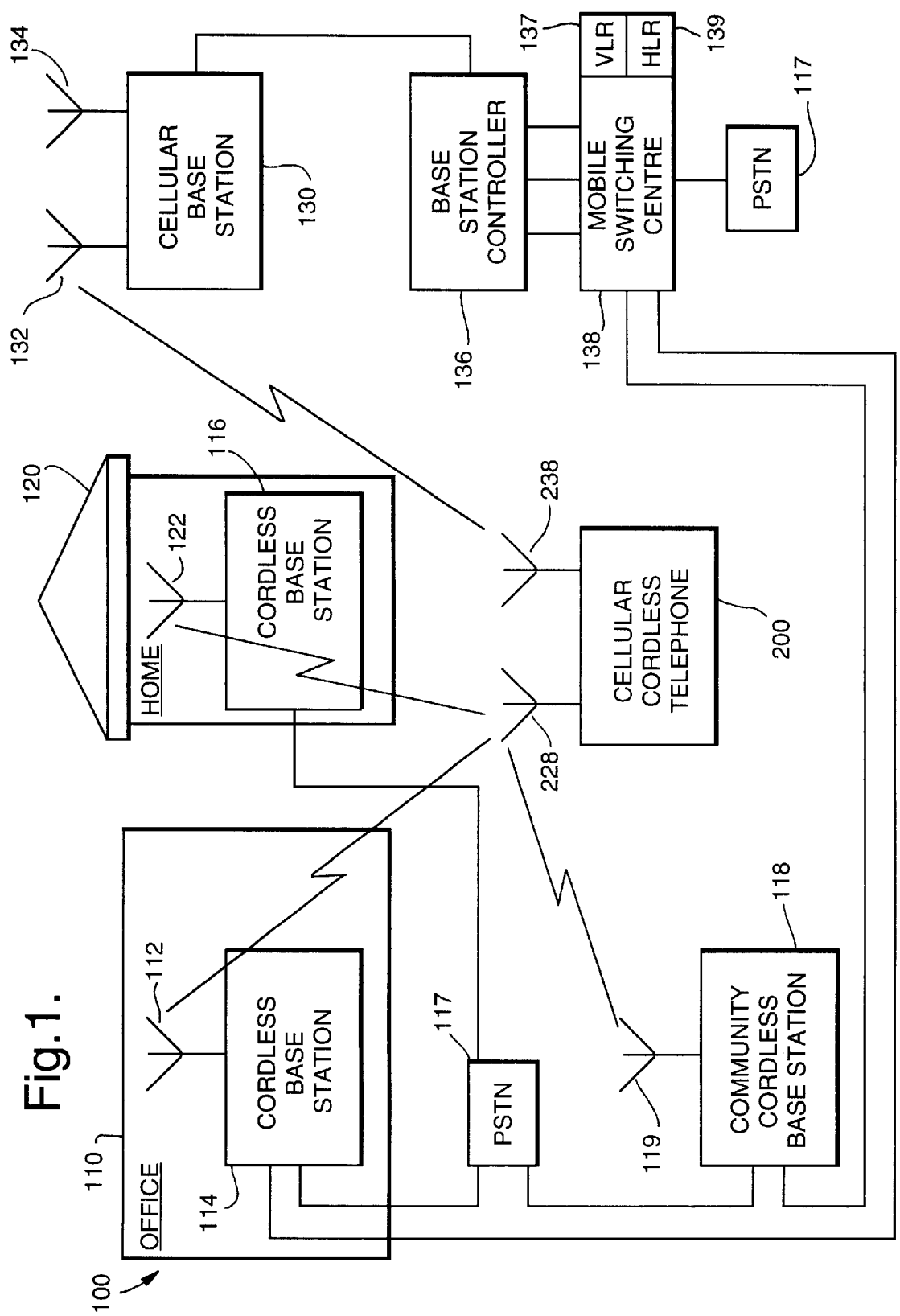
FIG. 1 is a block diagram of a cellular cordless telephone system embodying the present invention.

FIG. 1 illustrates a block diagram of a cellular cordless telephone system 100 which embodies the present invention. The system includes a Public Switched Telephone Network (PSTN) 117, connected by landlines to cordless base stations 114, 116 and 118 having respective landline telephone numbers and respectively located in an office building 110, domestic residence 120 or some other geographical location.

Cordless base stations 114, 116 and 118 communicate with the cellular cordless telephone (CCT) 200 via antennas 112, 119 and 122. Antennas 112, 119 and 122 may be implemented as any sort of suitable antenna such as a whip antenna, helical antenna or printed circuit antenna. The cordless base stations 114 and 116 may be a conventional cordless base station. Cordless base station 118 is a community cordless base station and such base stations may be located throughout an urban area, or common user area such as a railway station, shopping mall or airport, for providing a shared telephone service to CCTs 200. In such a case, the cordless base station 118 may include additional equipment not usually found in conventional cordless base stations for billing calls to a telephone number of CCT 200.

Also connected through telephone landlines to the PSTN 117 is the Mobile Switching Centre (MSC) 138 associated with Base Station Controller(s) (BSC) 136 for controlling Cellular Base Station(s) 130. Cellular base station 130 comprises both a receive antenna 132 and a transmit antenna 134 for communicating with CCTs 200.

Figure 2:
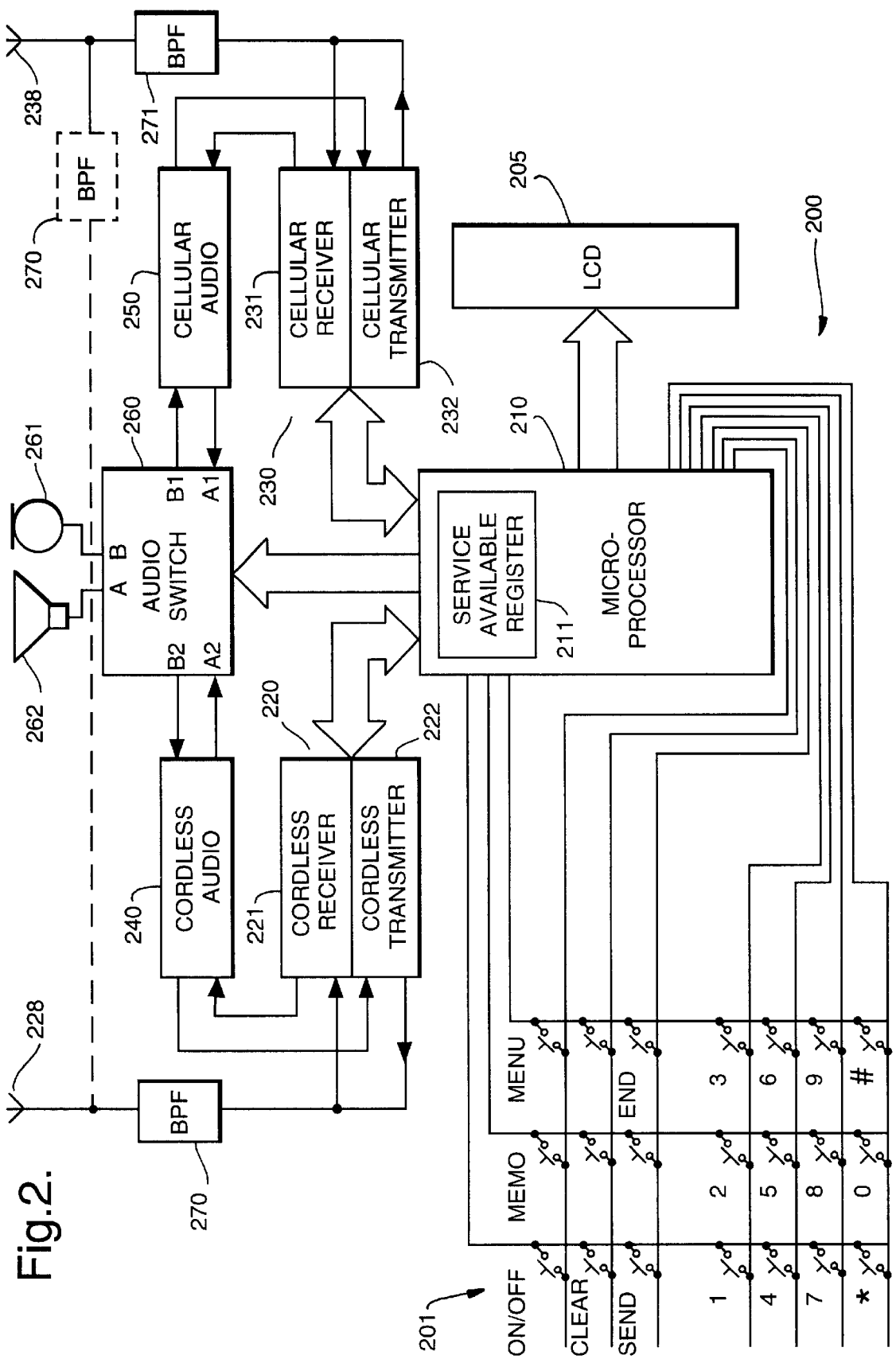
FIG. 2 is a block diagram of a cellular cordless telephone embodying the present invention.

The CCT 200 may be a mobile unit installed in a vehicle, a so called transportable unit or a hand held portable unit. CCT 200 comprises an antenna 228 for cordless communication and an antenna 238 for cellular communication. The CCT 200 may alternatively comprise a single antenna 238 for both cellular and cordless communication and arranged as illustrated in FIG. 2 by the dotted line 272. Typically in the UK cordless telephone systems operate in frequency bands at 49 MHz (CTØ), 860 MHz (CT2) and 1880–1900 MHz (DECT) and cellular telephone systems in frequency bands 890–905 MHz and 935–950 MHz (TACS), 905–915 MHz and 950–960 MHz (GSM) or 1800 MHz (DCS).

FIG. 2 illustrates a detailed block diagram of an embodiment of a CCT 200 in accordance with the present invention. CCT 200 comprises a cellular telephone transceiver 230, and antenna 238, a cordless telephone transceiver 220 and antenna 228, a microprocessor 210, keypad 201, display 205, audio switch 260, microphone 261 and speaker 262. The microphone 261, speaker 262 and keypad 201 may alternatively be located in a handset separate from the rest of the CCT 200. An alternative embodiment is shown by dashed line 272, in which cordless transceiver 220 and cellular transceiver 230 may be coupled to a single antenna 238 by way of band pass filters (BPF) 270 and (BPF) 271, respectively. Cordless telephone transceiver 220 may be any conventional cordless transceiver. However, it would be advantageous if the cordless telephone transceiver 220 conformed to a common air interface for cordless telephones, since this would facilitate roaming of the CCT 200 between different cordless systems. An example of such an interface is the recently introduced common air interface CAI for CT2 cordless systems. The cellular transceiver 230 may likewise be any conventional cellular transceiver. The keypad 201, microprocessor 210, display 205 and the like can be any available type, connected and arranged to operate in the CCT 200. The microprocessor 210 includes a Service Available Register (SAR) 211 for storing which radio systems are currently available to the CCT 200.

Figure 3:
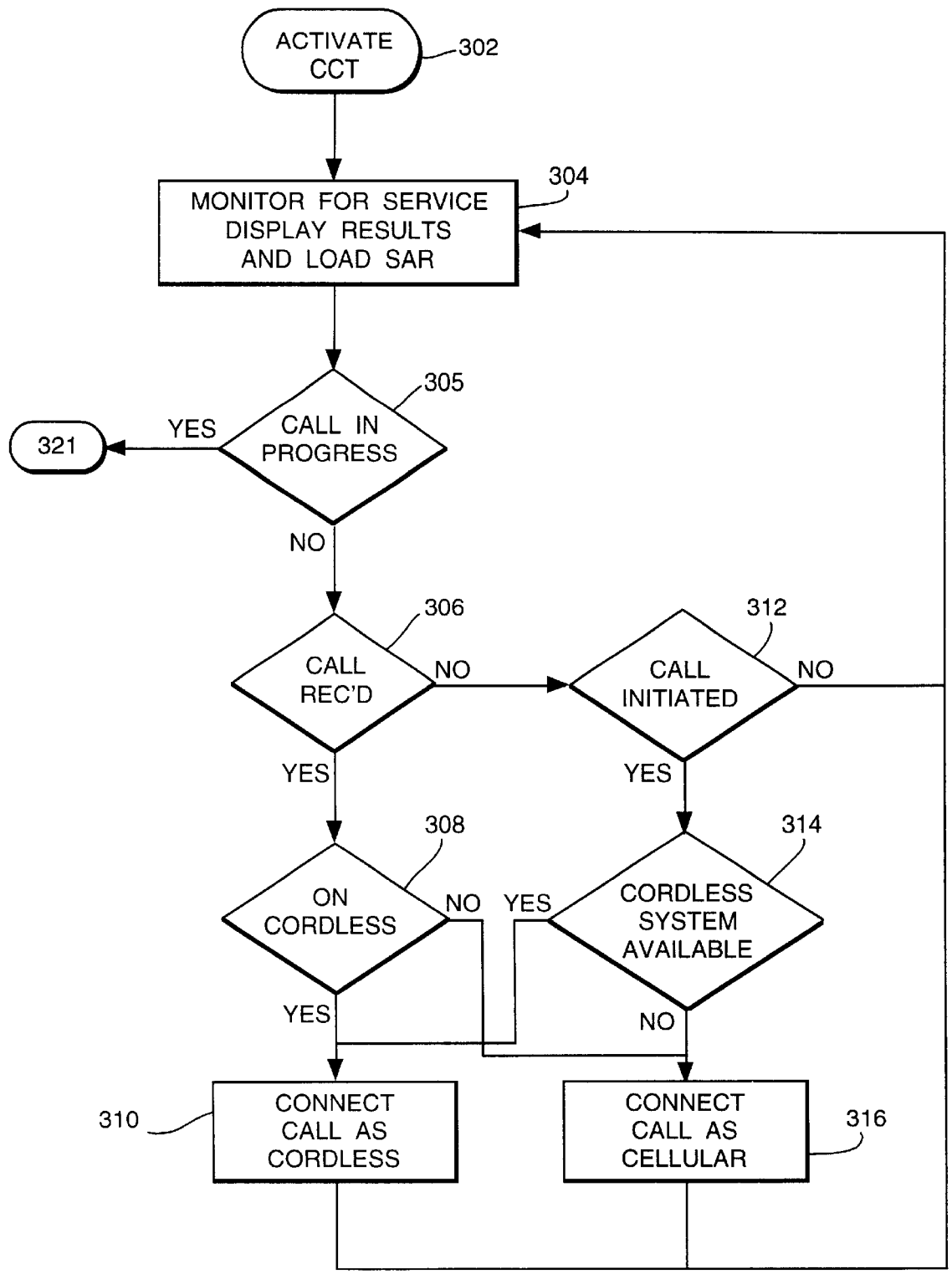
FIG. 3 is a flow diagram showing the operational steps taken under control of the microprocessor to monitor for system availability and connect the CCT to an appropriate system.
Figure 4:
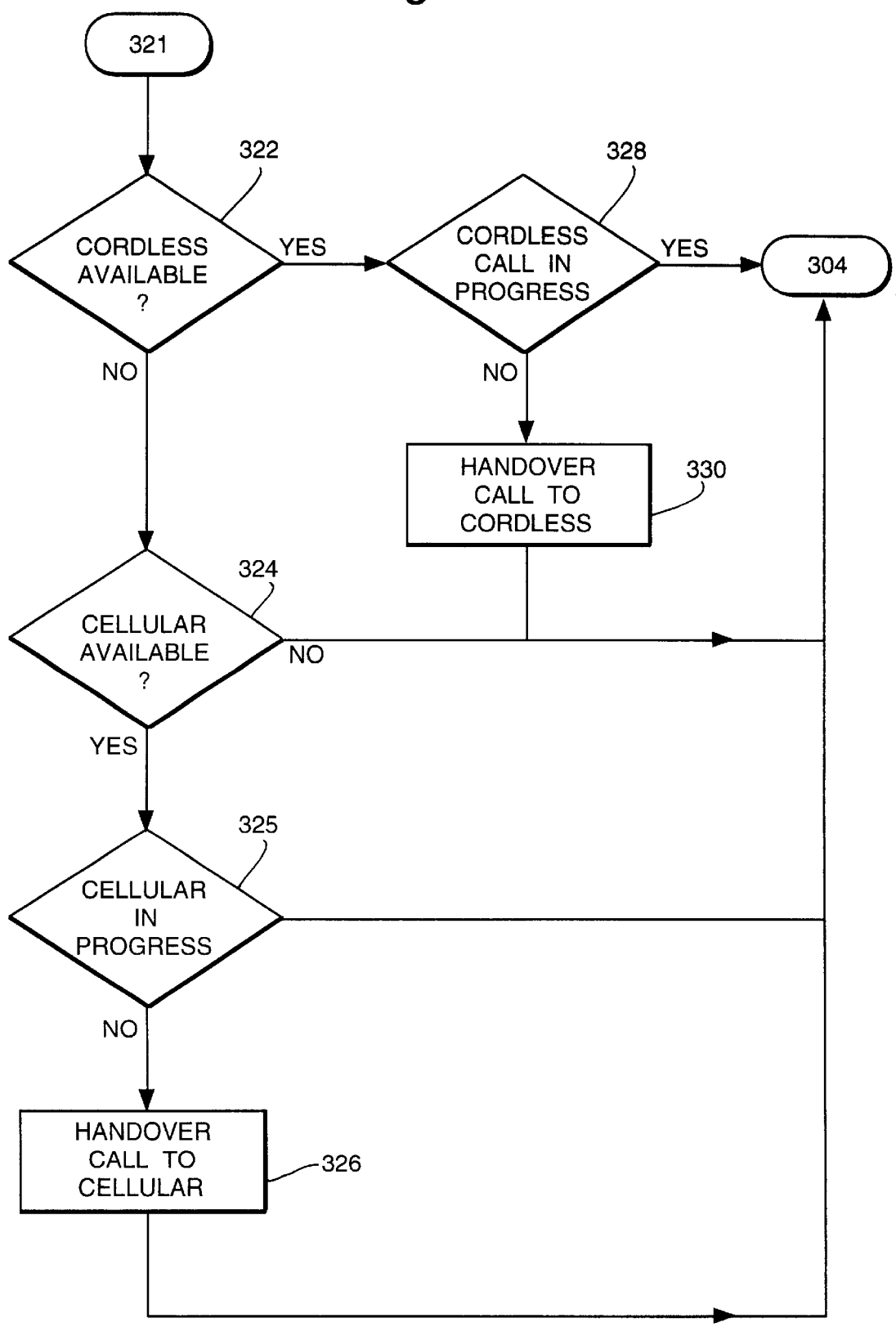
FIG. 4 is a flow diagram showing the operational steps taken under control of the microcomputer whilst a call is in progress.

The microprocessor 210 illustrated in FIG. 2 is adapted to operate in accordance with the flow charts illustrated in FIGS. 3–4, for controlling the CCT 200 as a cordless telephone, a cellular telephone or a cellular cordless telephone. Thus, in accordance with the present invention the CCT 200 may operate, as far as a user is concerned, simultaneously as a cellular telephone and a cordless telephone. For the sake of explanation and clarity, it should be noted that the CCT 200 can be so arranged such that both cellular and cordless operations are in progress at the same time. Alternatively, if components are shared between cellular and cordless parts, cellular and cordless operations can be performed at different times although this would be done at a speed sufficient for it to be undetectable by the user and therefore appear to be simultaneous operation.

When operating as a cordless telephone control signals from the microprocessor 210 enable cordless receiver 221 and cordless transmitter 222. The microprocessor 210 also monitors signals from the cordless receiver 221 indicating received signal strength and for detecting receive data, and from the cordless transmitter 222 for sending transmit data. Additionally, the microprocessor 210 monitors control signals from the cordless transceiver 220 for detecting incoming calls (ringing), security codes and broadcast information relevant to the cordless system, and for sending dialling information.

The microprocessor 210 controls the CCT 200 in a similar way when operating as a cellular telephone, but appropriately modified for the signalling protocols and data encryption used in the cellular system. The signalling protocols, data encryption techniques and the like used in respective telephone systems are well known in the art, and the microprocessor can be arranged to operate in a known manner to effect control of the signals in such systems.

The audio switch 260 is controlled by the microprocessor 210 to link the cordless audio channel 240 or the cellular audio channel 250 to the microphone 261 and loudspeaker 262 as appropriate.

Referring to FIG. 3, there is illustrated a flow diagram showing the steps used by microprocessor 210 for operating the CCT 200 to receive and place cellular or cordless telephone calls. In this example, for simplicity, there is a presumption that a cellular service is generally available when a cordless service is not, and that a cordless service is the preferred service. Entering at block 302, the user activates the CCT 200 and the microprocessor 210 monitors both the cellular and cordless system availability. If the cellular and/or cordless system are available the microprocessor 210 updates the display 205 and SAR 211 at step 304. Next at block 305 a check is made to see if a call is in progress or not. If not, then at block 306, a check is made to see if an incoming call is present. If not, the NO branch is taken to decision block 312 to see if a call has been initiated by the user. If not, NO branch is taken back to block 304 to continue monitoring for cellular and cordless system availability.

If an incoming call is present then the YES branch from decision block 306 is taken to decision block 308 where it is determined whether or not the incoming call is a cordless call. If so, the YES branch is taken from decision block 308 to block 310 and the incoming call is connected as a cordless call. Additionally, the display 205 can be activated to show that a cordless telephone call is in progress. If the incoming call is not a cordless call, then the NO branch is taken from decision block 308 to block 316 and the call is connected as a cellular call. The display 205 again can be activated, but this time to indicate that a cellular call is in progress.

Returning to decision block 312, if a call has been initiated then the YES branch is taken to decision block 314 to see if the system available register indicates that the cordless system is available. If so, then the YES branch is taken and the call is connected as a cordless call. If not, then the call is connected as a cellular call. Once a call has been connected then the CCT 200 microprocessor 210 returns to block 304 and continues monitoring for cellular and cordless systems.

Referring now to FIG. 4, once a call has been connected the CCT 200 continues to monitor for the availability of the cellular and cordless systems. At decision block 322 a check is made to see if the cordless system is available. If so, then the YES branch is taken to decision block 328 where it is determined whether the call in progress is a cordless call or not. If it is a cordless call, then the YES branch is taken to block 304 and the CCT 200 continues monitoring for the availability of the cellular and cordless systems. If the call in progress at decision block 328 is not a cordless call then the NO branch is taken to block 330 where handover of the call to the cordless system is initiated. Referring back to decision block 322, if the cordless system is not available, the NO branch is taken to decision block 304 where a check is made to see if the cellular system is available. If not, the NO branch is taken and the CCT 200 continues to monitor for cellular and cordless systems. If the cellular system is available then the YES branch is taken from decision block 324 to decision block 325 to check whether the call in progress is a cellular call. If so, then the YES branch is taken to block 304. If not, then the NO branch is taken to block 326 where handover of the call to the cellular system is initiated. The CCT 200 then continues to monitor the availability of cellular and cordless systems at block 304.

The handover of a call from a cordless system to a cellular system and vice versa can be performed manually or preferably automatically. Examples of handover between cellular and cordless systems, and vice versa, are disclosed in co-pending British Patent applications no 9320814.8 and no 9320815.8.

As mentioned previously, for simplicity the presumption that the cordless system is the preferred system, and that the cellular system is generally available when the cordless service is not has been made. The criteria for the decision blocks in the flow charts of FIGS. 3 and 4 have been correspondingly chosen. However, the criterion, or criteria, at each decision block may be far more complex. For example, they may be based on the quality of the signal from the available systems. In particular, the handover of a call in progress would typically be preceded by decisions based on the quality of system signals and whether signals from the current system were deteriorating or not. Such criteria would enable a call to be handed over before it was lost due to signal breakdown or the like.

Additionally, the criteria may be based on a user indicated or preprogrammed preference for any particular system, such as a cellular system and not a cordless system as presumed in the foregoing example.

The operation of CCT 200 illustrated in FIG. 3 is such that CCT 200 initially receives an incoming call in whatever system the incoming call originated. If the incoming call is from a system which does not fulfil the criteria for the choice of system, then the call may be transferred to the system which does fulfil the aforesaid criteria. Such a system could utilise a form of call forwarding as disclosed in U.S. Pat. No. 4,989,230. However, such call forwarding is instructed by CCT 200 and takes place only after the non-preferred part of the CCT 200 has been paged.

An alternative would be to have a cellular and cordless system which were interlinked so as to have knowledge of the geographical and/or system location of a particular CCT 200. In such an interlinked system, a call originating in a non-preferred system would be automatically redirected by the non-preferred system to the preferred system. Such a system would also facilitate inter-system handover whilst calls were in progress.

A radiotelephone suitable for such operation would be a combined GSM/DECT CCT 200. In the GSM system the cellular base stations 130 are connected to Mobile Switching Centres (MSCS) 138 which themselves may be connected to other MSCs, the PSTN 117 (as shown in FIG. 1) comprising the Integrated Services Digital Network (ISDN), or the like. The MSC 138 is also connected to a Visitor Location Register VLR 137, which is a data base of GSM subscriber files of GSM subscribers visiting the area of the MSC 138 to which the VLR relates. The MSC 138 also has a Home Location Register HLR 139 which is a database of all the subscribers having that particular MSC 138 as their home MSC. The MSC 138 is also connected to other elements of the GSM network such as an Authentication Centre AC and an Equipment Identity Register EIR. A more detailed description of the GSM system may be found in a book entitled "The GSM system for mobile communications", M. Mouly and M. Pautet, Palaiseau, France, ISBN: 2 9507190-0-7.

A cellular telephone or CCT 200 operating in a MSC area communicates with the MSC via a base station in order to register its presence in the area assigned to that particular MSC. Such registration may be carried out by a dual system GSM/DECT CCT 200 whilst it monitors the availability of the GSM system. Thus, the location of a CCT 200 phone within the GSM system would be known. Since the MSC 138 is connected to the PSTN 117, the location of a CCT 200 in the GSM system can also be known to the DECT system since the system is connected to DECT the land line PSTN system. DECT phones, in common with CT-2 type phones, are capable of being paged via community base stations as well as domestic base stations. Thus, knowledge of the location of a DECT or CT-2 phone must be possessed by the relevant cordless system. An example of such a cordless telephone system is disclosed in international application no. WO 92/03006. In the cordless system disclosed in WO 92/03006, a cordless telephone pre-registers with a cordless base station indicating to a network control centre (connected to the PSTN) the location of the cordless telephone. A combined GSM/DECT CCT 200 may perform the pre-registering during the monitoring for the availability of the GSM and DECT systems. Since the network control centre (Central Control Fixed Part (CCFP)) of the cordless system (DECT) is connected to the PSTN, and the PSTN in turn is connected to the MSC of the GSM system, both the network control centre and the MSC may have access to the whereabouts of respective GSM and DECT phone numbers. However, the signalling between the network control centre of the cordless system and the MSC would need to be very fast, and need to utilise the ISDN of the PSTN.

Figure 5:
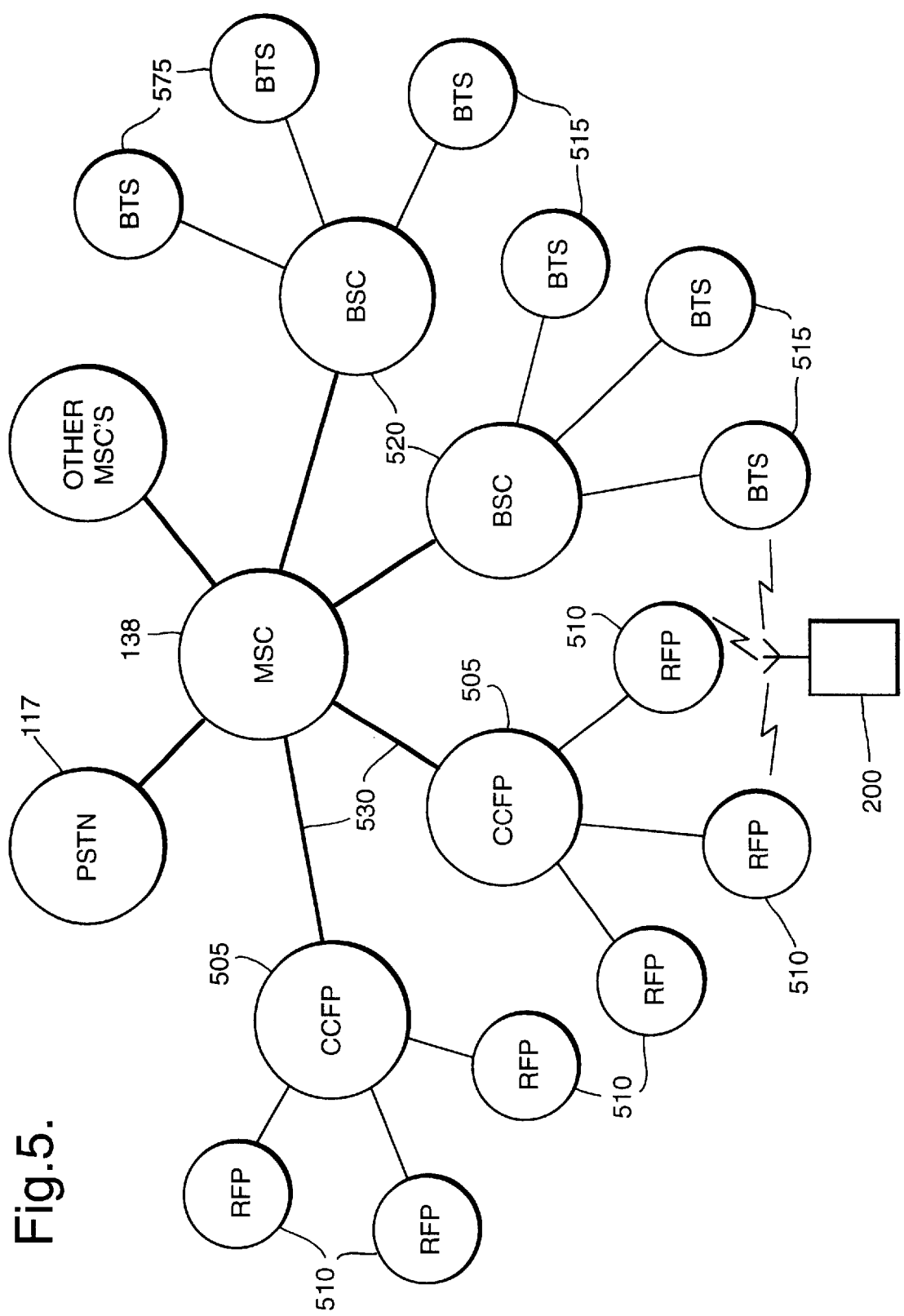
FIG. 5 is a block diagram of a combined DECT/GSM network.

An alternative GSM/DECT combined system is shown schematically in FIG. 5. In this system, within the area of each GSM MSC 138, there are a number of Central Control Fixed. Parts (CCFP) 505. Each CCFP 505 controls a number of cordless base stations., known as Radio Fixed Parts (RFP) 510 in the DECT system, and is connected directly to its local MSC 138. Such direct connections 530 may be by land line or preferably by line of sight radio communication. The RFPs 510 and CCFP 505 may comprise a community DECT system in an airport or the like, or may comprise a private office based DECT system. Access to the PSTN from the DECT system is then via the MSC 138 of the GSM system. Calls made from DECT to the PSTN and vice versa, via the MSC 138 would not need to be any more expensive than other non-cellular/GSM calls, since the complex switching and handover protocols required for GSM is not necessary. The MSC 138 can also be connected to Base Station Controllers (BSC's) 520 which in turn are connected to and control Base Transceiver stations (BTS) 515, forming part of the conventional GSM system.

The direct link 530 between the CCFP 505 and MSC 138 has an information bandwidth of typically 2 Mbits/s. Such a bandwidth is capable of transmitting the necessary control signals between the MSC 138 and the CCFP505 to facilitate automatic paging between systems and automatic handover between systems. Furthermore, the CCFP 505 of the DECT system may have access to the VLR 137, HLR 139, AC and EIR of MSC 138 via the direct link 530. Thus, each CCFP 505 can monitor the whereabouts of other radio telephones and can also use the security checks provided by the GSM system to monitor radio telephones logged onto the DECT system.

A CCT 200 in accordance with the present invention and operating as a GSM/DECT CCT 200 in either GSM/DECT environment as described above, may register with whichever system fulfils the criteria for operating the CCT 200 in a particular system. Alternatively, the CCT 200 may register with both systems but preferably operate in only one of them. Thus a call originating on any particular system will be directed via the MSC, PSTN and network control centre as appropriate to the system on which the paged CCT 200 is registered, or to the system for which the paged CCT 200 has indicated a preference.

Additionally, inter system knowledge of the location of CCTs 200 will facilitate handover during calls. For example, if a CCT 200 having a call in progress on a non-preferred system enters the service area of a preferred system then the CCT 200 can register with the preferred system, and flag to the system MSC or network control centre that it is a preferred system. Then, the preferred system MSC or network control centre can communicate with the non-preferred system's MSC or network control centre and instruct it to handover the call to the preferred system.

In view of the foregoing description it will be evident to a person skilled in the art that various modifications may be made within the scope of the invention. For example, a multi-system radio telephone could be operable for more than two radio systems, and not necessarily for a cellular and a cordless system. For instance a cellular phone combined with a satellite communication phone or a micro-cellular (e.g. DCS 1800) and GSM phones. Other possible combinations could be JDC (PDC)/PHP and CT2/AMPS phones.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

I claim:

1. A radio telephone system adapted to co-operate with at least one other different radio telephone system, the radio telephone system comprising:

user information exchange means respectively associated with each of the at least one other different radio telephone system for exchanging user information signals between the radio telephone system and the at least one other different radio telephone system, monitoring means for monitoring user information signals of the radio telephone systems, and selection means for automatically assigning and re-assigning a user to one of the radio telephone systems in accordance with the user information signals, wherein the user information signals includes criterion data used by the selection means in determining whether to automatically assign and re-assign the user to one of the radio telephone systems, and wherein the selection means automatically assigns and re-assigns the user based upon the criterion data in the user information signals fulfilling at least one predetermined criterion, wherein the at least one predetermined criterion comprises radio transmissions between the user and one of the radio telephone systems having a lower bit error rate than radio transmission with another one of the radio telephone systems.

2. A radio telephone system according to claim 1, wherein at least one predetermined criterion is a user indicated preference for one of the radio telephone systems.

3. A radio telephone system according to claim 1, wherein at least one predetermined criterion is that the one of the radio telephone systems has greatest received signal strength.

4. A radio telephone system according to claim 1, wherein at least the one predetermined criterion is that the user has access rights to one of the radio telephone systems.

5. A radio telephone system according to claim 1, wherein at least one predetermined criterion is that one of the radio telephone systems requests selection.

6. A radio telephone system according to claim 1, wherein at least one predetermined criterion is that radio and transmissions between the user and the one of the radio telephone systems has lower frame error rate.

7. A radio telephone system according to claim 1, wherein at least one predetermined criterion is that the velocity of the user of the one of the radio telephone systems exceeds a predetermined value.

8. a radio telephone system according to claim 1, wherein the monitoring means monitors the user information signals intermittently.

9. A radio telephone system according to claim 1, capable of monitoring the signals during a period of nominal TDMA inactivity of an assigned one of the radio telephone systems.

10. A radio telephone system according to claim 1, wherein the radio telephone system comprises a cellular radio telephone system and the at least one other radio telephone system comprises a cordless radio telephone system.

11. A radio telephone system according to claim 1, wherein the radio telephone system comprises a GSM radio telephone system and the at least one other radio telephone system comprises a DECT radio telephone system.

12. A method for operating a radio telephone system to co-operate with at least one other radio telephone system, comprising:

exchanging user information respectively associated with each of the at least one other radio telephone system between the radio telephone system and the at least one other radio telephone system, monitoring user information signals exchanged between the radio telephone systems, determining whether the user information signals fulfill at least one predetermined criterion, and automatically assigning and re-assigning a user to one of the radio telephone systems in accordance with the user information signals fulfilling the at least one predetermined criterion, wherein the at least one predetermined criterion comprises radio transmissions between the user and the one of the radio telephone systems having a lower bit error rate, frame error rate.

13. A method according to claim 12, wherein at least one predetermined criterion is a user indicated preference for one of the radio telephone systems.

14. A method system according to claim 12, wherein at least one predetermined criterion is that the one of the radio telephone systems has greatest received signal strength.

15. A method according to claim 12, wherein at least the one predetermined criterion is that the user has access rights to one of the radio telephone systems.

16. A method according to claim 12, wherein at least one predetermined criterion is that one of the radio telephone systems requests selection.

17. A method according to claim 12, wherein at least one predetermined criterion is that the velocity of the user of the one of the radio telephone systems exceeds a predetermined value.

18. A method according to claim 12, wherein monitoring of user information signals is performed intermittently.

19. A radio telephone system operable in accordance with claim 12, wherein monitoring of the signals is capable of being performed during a period of nominal TDMA inactivity of an assigned one of the radio telephone systems.

20. A radio telephone system operable in accordance with claim 12, wherein the radio telephone system comprises a cellular radio telephone system and the at least one other radio telephone system comprises a cordless radio telephone system.

21. A radio telephone system operable in accordance with claim 12, wherein the radio telephone system comprises a GSM radio telephone system and the at least one other radio telephone system comprises a DECT radio telephone system.

* * * * *